(12) United States Patent
Kang et al.

(10) Patent No.: US 12,487,755 B2
(45) Date of Patent: Dec. 2, 2025

(54) STORAGE DEVICE FOR PERFORMING A STATE SHAPING OPERATION ON DATA BASED ON A SPEED CHARACTERISTIC OF A MEMORY CELL AND OPERATION METHOD THEREOF

(71) Applicant: SAMSUNG ELECTRONICS CO., LTD., Suwon-si (KR)

(72) Inventors: Woohyun Kang, Suwon-si (KR); Garam Kim, Suwon-si (KR); Jisoo Kim, Suwon-si (KR); Sangkwon Moon, Suwon-si (KR); Hyunkyo Oh, Suwon-si (KR); Jin Gu Jeong, Suwon-si (KR); Youngjun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/421,352

(22) Filed: Jan. 24, 2024

(65) Prior Publication Data
US 2025/0060885 A1 Feb. 20, 2025

(30) Foreign Application Priority Data
Aug. 17, 2023 (KR) .................... 10-2023-0107658

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)

(58) Field of Classification Search
CPC ..... G06F 3/0619; G06F 3/0653; G06F 3/0679
See application file for complete search history.

(56) References Cited

U.S. PATENT DOCUMENTS

| | | | |
|---|---|---|---|
| 8,767,475 B2 | 7/2014 | Cho et al. |
| 9,032,278 B2 | 5/2015 | Yang |
| 9,165,662 B2 | 10/2015 | Kim et al. |
| 9,734,898 B2 | 8/2017 | Seol et al. |
| 10,949,119 B2 | 3/2021 | Rozman et al. |
| 11,322,208 B2 | 5/2022 | Seo et al. |
| 11,372,551 B2 | 6/2022 | Choi et al. |

(Continued)

FOREIGN PATENT DOCUMENTS

KR 10-1821604 B1 1/2018

*Primary Examiner* — Edward J Dudek, Jr.
(74) *Attorney, Agent, or Firm* — Sughrue Mion, PLLC

(57) ABSTRACT

A storage device according to an embodiment includes a memory device configured to apply a first program voltage and a first verification voltage to a first word line and output, based on a program state of each of a plurality of memory cells connected to the first word line, a speed information representing a speed characteristic of each of the plurality of memory cells; and a memory controller configured to determine at least one memory cell to be programmed into a predetermined program state; determine, among the at least one memory cell, at least one target memory cell having a first speed characteristic based on the speed information; and perform a state-shaping operation to convert a data corresponding to the predetermined program state for the at least one target memory cell into a value corresponding to a program state different from the predetermined program state.

19 Claims, 16 Drawing Sheets

(56) References Cited

U.S. PATENT DOCUMENTS

| | | |
|---|---|---|
| 11,482,290 B2 | 10/2022 | Lee et al. |
| 2013/0028018 A1 | 1/2013 | Cho et al. |
| 2014/0189222 A1 | 7/2014 | Yang |
| 2015/0058536 A1 | 2/2015 | Seol et al. |
| 2015/0070987 A1 | 3/2015 | Kim et al. |
| 2019/0258423 A1* | 8/2019 | Rozman .............. G06F 11/0727 |
| 2020/0013458 A1* | 1/2020 | Schreck .............. G11C 11/4076 |
| 2021/0034251 A1* | 2/2021 | Choi ..................... G06F 3/0658 |
| 2021/0225451 A1* | 7/2021 | Seo ..................... G11C 11/5628 |
| 2023/0245706 A1* | 8/2023 | Song ..................... G11C 16/26 |
| | | 365/185.22 |
| 2023/0298668 A1* | 9/2023 | Choi ..................... G11C 16/10 |
| | | 365/185.28 |

* cited by examiner

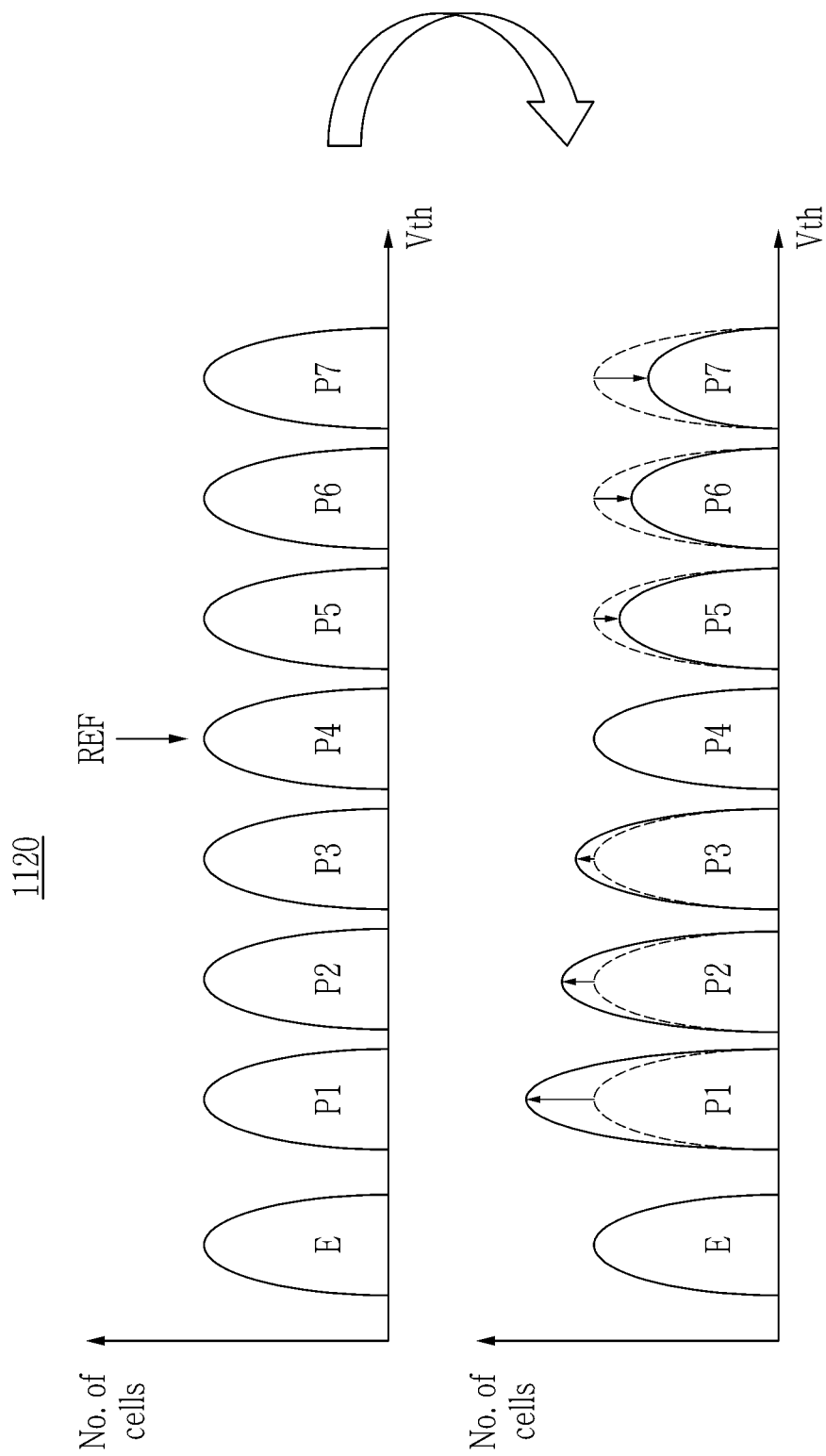

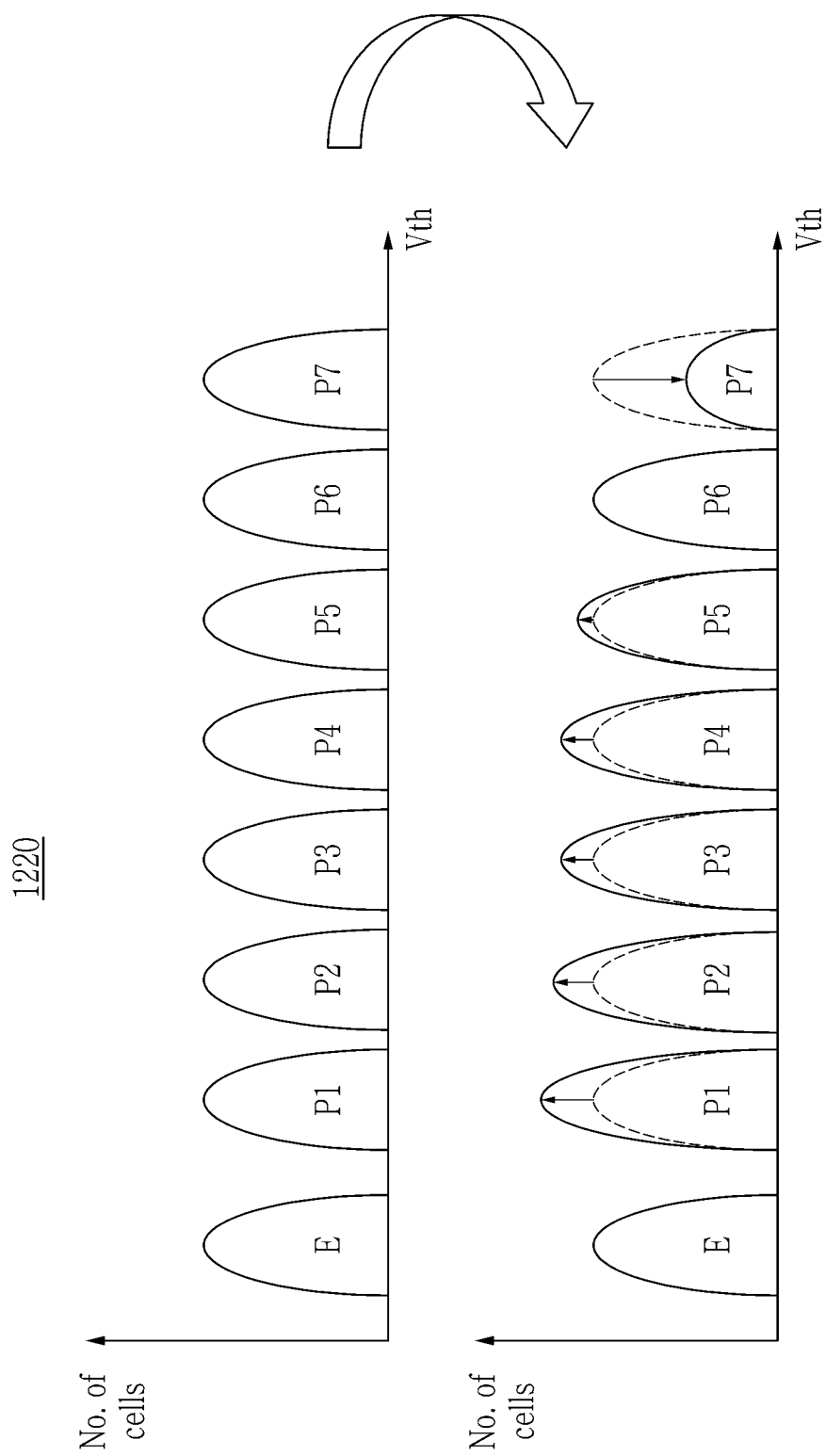

STORAGE DEVICE FOR PERFORMING A STATE SHAPING OPERATION ON DATA BASED ON A SPEED CHARACTERISTIC OF A MEMORY CELL AND OPERATION METHOD THEREOF

CROSS-REFERENCE TO RELATED APPLICATION

This application claims priority to and the benefit of Korean Patent Application No. 10-2023-0107658 filed in the Korean Intellectual Property Office on Aug. 17, 2023, the entire contents of which are herein incorporated by reference.

BACKGROUND

Embodiments of the disclosure relate to a storage device and an operation method thereof.

A storage device is a memory device capable of recording and/or reading data. The storage device may include a non-volatile memory (NVM), in which stored data is not destroyed even if a power is not supplied, and a volatile memory (VM), in which stored data is destroyed if a power is not supplied.

As the size of the storage devices is in the trend of decrease and a level of integration increases, temporary or permanent defect of degraded distribution may occur. This poor distribution of the storage device has a problem of deteriorating a data reliability of the storage device.

SUMMARY

An embodiment is to provide a storage device and an operation method thereof that may perform a state shaping operation on data based on a speed characteristic of a memory cell.

An embodiment is to provide a storage device and an operation method thereof that may improve a data reliability of the storage device and reduce an increase of an error bit.

A storage device according to an embodiment may include a memory device configured to select a first word line among a plurality of word lines; apply a first program voltage and a first verification voltage to the first word line; and output, based on a program state of each of a plurality of memory cells connected to the first word line that is read based on the first verification voltage, a speed information representing a speed characteristic of each of the plurality of memory cells; and a memory controller configured to determine, among the plurality of memory cells, at least one memory cell to be programmed into a predetermined program state among a plurality of program states; determine, among the at least one memory cell, at least one target memory cell having a first speed characteristic based on the speed information; and perform a state-shaping operation to convert a data corresponding to the predetermined program state for the at least one target memory cell into a value corresponding to a program state that is different from the predetermined program state.

An operation method of a storage device according to an embodiment may include selecting a first word line among a plurality of word lines; generating a speed information representing a speed characteristic of each of a plurality of memory cells connected to the first word line; determining at least one memory cell among the plurality of memory cells that is programmed into a predetermined program state among a plurality of program states; determining a first memory cell among the at least one memory cell based on the speed information; and performing a state-shaping operation to convert a data corresponding to the predetermined program state for the first memory cell into a value corresponding to a program state different from the predetermined program state.

A computing system according to an embodiment may include a host device configured to output a command requesting a program operation of a memory device; and a memory controller configured to receive, from the memory device, a speed information indicating whether a plurality of memory cells connected to a select word line are fast cells or slow cells; determine a target memory cell, among the fast cells, that is to be programmed into a predetermined program state among a plurality of program states; and perform, based on the command, a state-shaping operation on a data corresponding to the predetermined program state for the target memory cell.

BRIEF DESCRIPTION OF DRAWINGS

The above and other aspects, features, and advantages of certain example embodiments of the disclosure will be more apparent from the following description taken in conjunction with the accompanying drawings.

FIG. 11B is a view to explain a target distribution of a memory cell according to an embodiment.

FIG. 12B is a view to explain a target distribution of a memory cell according to an embodiment.

DETAILED DESCRIPTION

Figure 1:
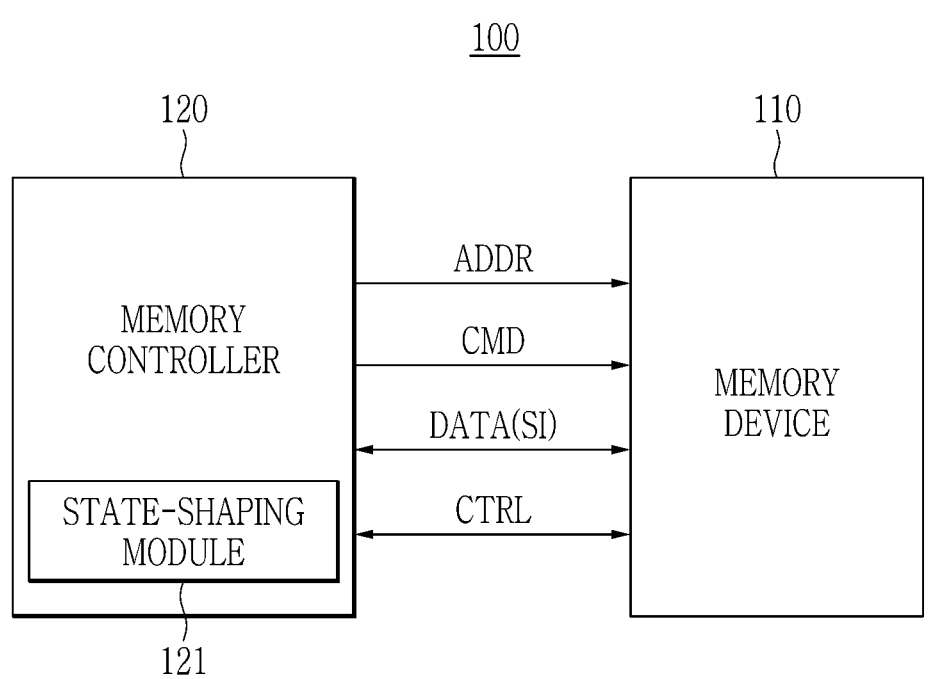
FIG. 1 is a schematic block diagram of a storage device according to an embodiment.

In the following detailed description, only certain example embodiments of the disclosure have been shown and described, simply by way of illustration. As those skilled in the art would realize, the described embodiments may be modified in various different ways, all without departing from the spirit or scope of the disclosure.

Accordingly, the drawings and description are to be regarded as illustrative in nature and not restrictive. Like reference numerals designate like elements throughout the specification. In a flowchart described with reference to the drawings, an order of operations may be changed, several operations may be merged, some operations may be divided, and some operations may not be performed.

In addition, expressions written in the singular may be construed in the singular or plural unless an explicit expression such as "one" or "single" is used. Terms including ordinal numbers such as first, second, and the like will be used only to describe various components, and are not to be interpreted as limiting these components. These terms may be used for the purpose of distinguishing one constituent element from other constituent elements. As used herein, the term "and/or" includes any or all combinations of one or more of the associated listed items. Expressions such as "at least one of," when preceding a list of elements, modify the entire list of elements and do not modify the individual elements of the list. For example, the expression "at least one of a, b, and c," should be understood as including only a, only b, only c, both a and b, both a and c, both b and c, or all of a, b, and c.

FIG. 1 is a schematic block diagram of a storage device according to an embodiment.

A storage device 100 may communicate with a host through various interfaces. The host may request a data processing operation, for example, a data read operation, a data write (or program) operation, and a data erase operation, etc. of the storage device 100. For example, the host may be a central processing unit (CPU), a graphic processing unit (GPU), a microprocessor, or an application processor (AP).

The storage device 100 may be implemented in various types such as, for example but not limited to, a solid-state drives (SSD), an embedded multimedia card (eMMC), a universal flash storage (UFS), a compact flash (CF), a secure digital (SD), a micro secure digital, a mini-SD, an extreme digital (xD), or a memory stick.

The storage device 100 may include a memory device 110 and a memory controller 120.

The memory controller 120 may be configured to access the memory device 110 in response to a request from the host. The memory controller 120 may be configured to provide an interface between the memory device 110 and the host. Additionally, the memory controller 120 may be configured to drive a firmware for controlling the memory device 110.

The memory controller 120 may control the operation of the memory device 110. Specifically, the memory controller 120 may provide at least one of an address ADDR, a command CMD, a data DATA, and a control signal CTRL along an input/output line connected to the memory device 110.

The memory controller 120 may write data DATA to the memory device 110, erase data DATA from the memory device 110, and/or read data DATA from the memory device 110 by using at least one of the address ADDR, the command CMD, and the control signal CTRL. The control signal CTRL may include a chip enable CE, a write enable WE, a read enable RE, etc.

If the command CMD received from the host is a program command, the memory cell in the memory device 110 may be programmed to at least one program state and an erase state based on the program operation. As the memory cell in the memory device 110 reaches a higher program state, the memory cell may be easily degraded due to a stress caused by repetitive program operations thereon. As the memory cell reaches a higher program state, an amount of distribution movement of a threshold voltage of the memory cell may increase due to the degradation. This may deteriorate data reliability of the memory cell.

In order to prevent the degradation of the memory cell in the memory device 110, the memory controller 120 may include a state-shaping module 121. The state-shaping module 121 may reduce a number of data corresponding to a program state in which degradation may easily occur due to a speed characteristic of the memory cell.

In an embodiment, the state-shaping module 121 may perform a state-shaping operation on data corresponding to a program state that is prone to degradation. In an embodiment, the state-shaping module 121 may perform a state-shaping operation on data corresponding to a program state in which an amount of distribution movement of the threshold voltage is large due to degradation. The state-shaping operation may include an operation of converting a data having a predetermined value to have a different value wherein the data having the predetermined value corresponds to a program state that may have a negative impact on the data reliability. In this manner, a number of times that the data having the predetermined value is programmed into the memory device 110 may be reduced.

Depending on a characteristic of the memory cell, the above-described degradation phenomenon and amount of the distribution movement may be further intensified or reduced. Therefore, before performing the state-shaping operation, the state-shaping module 121 may receive an information indicating the characteristic of the memory cell connected to each word line WL. In an embodiment, the characteristic of the memory cell may be a speed characteristic of the memory cell that is related to a program speed of the memory cell. The state-shaping module 121 may perform the state-shaping operation on data corresponding to a program state that is prone to degradation based on the speed characteristic of the memory cell.

The memory device 110 may be, for example but not limited to, a non-volatile memory device such as a NAND flash memory, a vertical NAND (VNAND) flash memory, a bonding vertical NAND (BVNAND) flash memory, a NOR flash memory, a resistive random access memory (RRAM), a phase-change RAM (PRAM), a magneto resistive RAM (MRAM), a ferroelectric RAM (FRAM), a spin transfer torque RAM (STT-RAM), a conductive bridging RAM (CBRAM), and the like.

Figure 2:
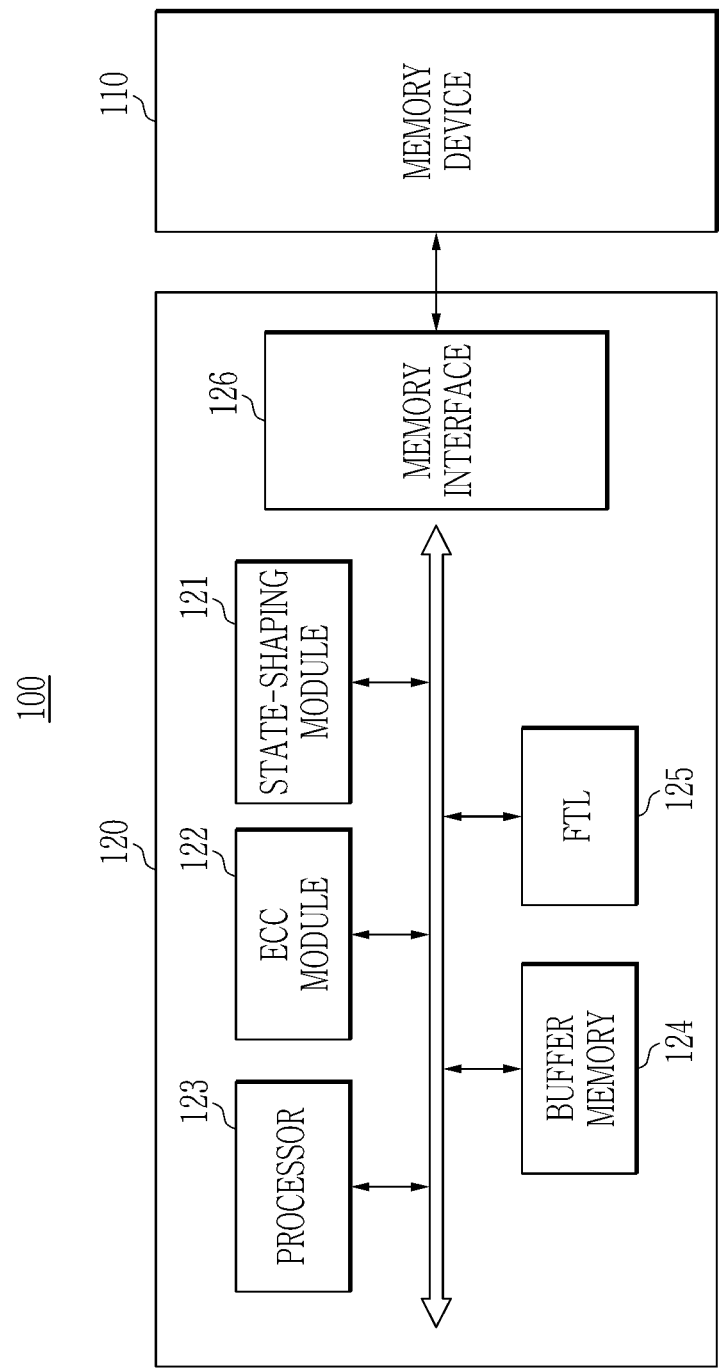
FIG. 2 is a schematic block diagram to explain a memory controller of FIG. 1.

FIG. 2 is a schematic block diagram to explain a memory controller of FIG. 1. The memory controller 120 may include a state-shaping module 121, an error correction code (ECC) module 122, a processor 123, a buffer memory 124, a flash translation layer (FTL) 125, and a memory interface 126.

The state-shaping module 121 may be the same as or similar to the state-shaping module 121 of FIG. 1 and the detailed description thereof is omitted. The operation method of the state-shaping module 121 according to an embodiment will be explained later with reference to FIG. 7.

The error correction code (ECC) module 122 may perform an ECC operation to generate an error correction code corresponding to data received from an external device. Also, the ECC module 122 may perform the ECC operation to generate the error correction code corresponding to data state-shaped by the state-shaping module 121. The ECC module 122 may detect and correct an error in the data read from the memory device 110 based on the error correction code.

The processor 123 may control the overall operation of the memory controller 120. The processor 123 may control the memory controller 120 by driving a firmware loaded in the FTL 125. In an embodiment, the processor 123 may include a central processing unit (CPU), a controller, or an application specific integrated circuit (ASIC), and the like.

The buffer memory 124 may store commands and data to be executed and processed by the memory controller 120. The buffer memory 124 may temporarily store data stored in or to be stored in the memory device 110. The processor 123 may use the buffer memory 124 as an operation memory of the processor 123.

The FTL 125 may include a firmware and/or a software that manages a data reading, writing, and/or erase operation of the memory device 110. The firmware and/or software of the FTL 125 may be executed by the processor 123.

The memory interface 126 may provide a signal transmission and/or reception with the memory device 110. The memory interface 126 may transmit a command along with data to be written to the memory device 110 to the memory device 110, or may receive data read from the memory device 110.

Figure 3:
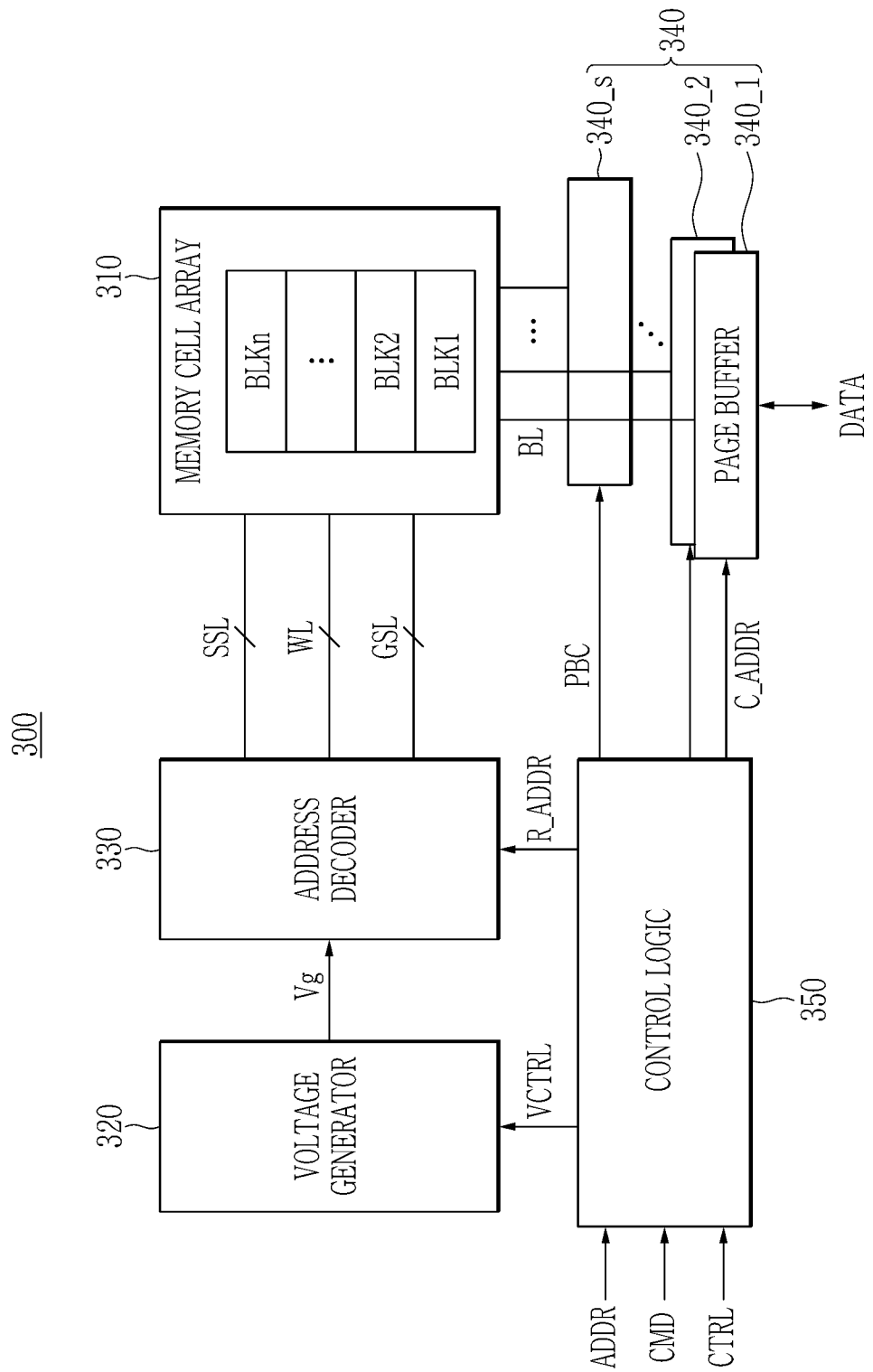
FIG. 3 is a schematic block diagram to explain a memory device of FIG. 1.

FIG. 3 is a schematic block diagram to explain a memory device of FIG. 1.

A memory device 300 may correspond to the memory device 110 in FIG. 1. The memory device 300 may include a memory cell array 310, a voltage generator 320, an address decoder 330, a page buffer 340, and a control logic 350.

The memory cell array 310 may include a plurality of memory blocks BLK1 to BLKn. Each of the plurality of memory blocks BLK1 to BLKn may be connected to the address decoder 330 through a word line WL, a string select line SSL, and a ground select line GSL and may be connected to the page buffer 340 through a bit line BL.

The memory cell array 310 may include a plurality of memory cells disposed in regions where the plurality of word lines WL and the plurality of bit lines BL intersect each other. Each memory cell may be used as a cell type, such as a single-level cell (SLC), a multi-level cell (MLC), a triple-level cell (TLC), and a quad-level cell (QLC).

The memory cell array 310 may include a non-volatile memory cell. For example, the memory cell array 310 may include a two-dimensional (2D) NAND memory array or a three-dimensional (3D) vertical NAND (VNAND) memory array.

The voltage generator 320 may receive a power as an input, regulate a voltage signal Vg for the memory operation based on a voltage control signal VCTRL, and provide the regulated voltage signal Vg to the memory cell array 310 through the address decoder 330. The voltage generator 320 may generate various types of voltages to perform the program operation and the erase operation on the memory cell array 310 based on the voltage control signal VCTRL. Specifically, the voltage generator 320 may generate a word line voltage, for example, a program voltage and a verification voltage, etc. based on the voltage control signal VCTRL. In an embodiment, the voltage generator 320 may generate a program voltage and a verification voltage, of which a level changes as the number of program loops increases, based on the voltage control signal VCTRL. When performing the program loop, a program method according to an embodiment may be performed with an incremental step pulse programming (ISPP) method, and the voltage generator 320 may generate a program voltage of which a level becomes increasingly higher than a previous program voltage every time a program loop is performed.

The voltage generator 320 may generate a word line voltage to determine the speed characteristic of the memory cell included in the memory cell array 310 before performing the program operation for the memory cell array 310. In one embodiment, the voltage generator 320 may perform a program loop that generates a program voltage and a verification voltage to determine the speed characteristic of the memory cell included in the memory cell array 310. In an embodiment, the program voltage and the verification voltage for determining the speed characteristic of the memory cell may respectively be the same as or different from a first program voltage and a verification voltage for performing the program operation on the memory cell.

The address decoder 330 may be connected to the memory cell array 310 through the word line WL, the string select line SSL, and the ground select line GSL. The address decoder 330 may decode a row address R_ADDR to select at least one of the plurality of memory blocks BLK1 to BLKn. That is, the address decoder 330 may select the word line WL, the string select line SSL, and the ground select line GSL by using the row address R_ADDR. The address decoder 330 may provide the voltage signal Vg supplied from the voltage generator 320 to the word line WL. The address decoder 330 may receive the word line voltage for determining the speed characteristic of the memory cell from the voltage generator 320, and provide the word line voltage to the word line WL of the plurality of memory cells. The address decoder 330 may receive at least one verification voltage and at least one program voltage in every program loop from the voltage generator 320 to be provided to the word line WL of the plurality of memory cells. The address decoder 330 may receive a read voltage from the voltage generator 320 to be provided to the word line WL of the plurality of memory cells.

The page buffer 340 may include a first page buffer 410_1 to an s-th (s being larger than 3) page buffer 340_s. The first to the s-th page buffers 340_1 to 340_s may be connected to the plurality of memory cells through the plurality of bit lines BL. The page buffer 340 may select at least one bit line among the plurality of bit lines BL based on a column address C_ADDR. The page buffer 340 may be operated as a write driver or a sense amplifier depending on the operation mode. For example, during the program operation, the page buffer 340 may receive data DATA from the memory controller (120 in FIG. 1), and apply a bit line voltage corresponding to the data DATA to the selected bit line. The page buffer 340 may detect a current or voltage of the selected bit line and provide the speed characteristic of the memory cell to the memory controller 120. During the read operation, the page buffer 340 may detect the current or voltage of the selected bit line, and detect data DATA stored in the memory cell array 310 to be provided to the memory controller 120.

The control logic 350 may provide each control signal related to the memory operation to the voltage generator 320, the address decoder 330, and the page buffer 340. The control logic 350 may control the overall operation of the memory device 300. The control logic 350 may control the memory device 300 by using an internal control signal based on at least one of the address ADDR, the command CMD, and the control signal CTRL received from the memory controller 120. For example, the control logic 350 may generate a voltage control signal VCTRL to control the voltage generator 320, or generate the row address R_ADDR and the column address C_ADDR based on the address ADDR. The control logic 350 may output the row address R_ADDR to the address decoder 330, or output the column address C_ADDR to the page buffer 340.

Figure 4:
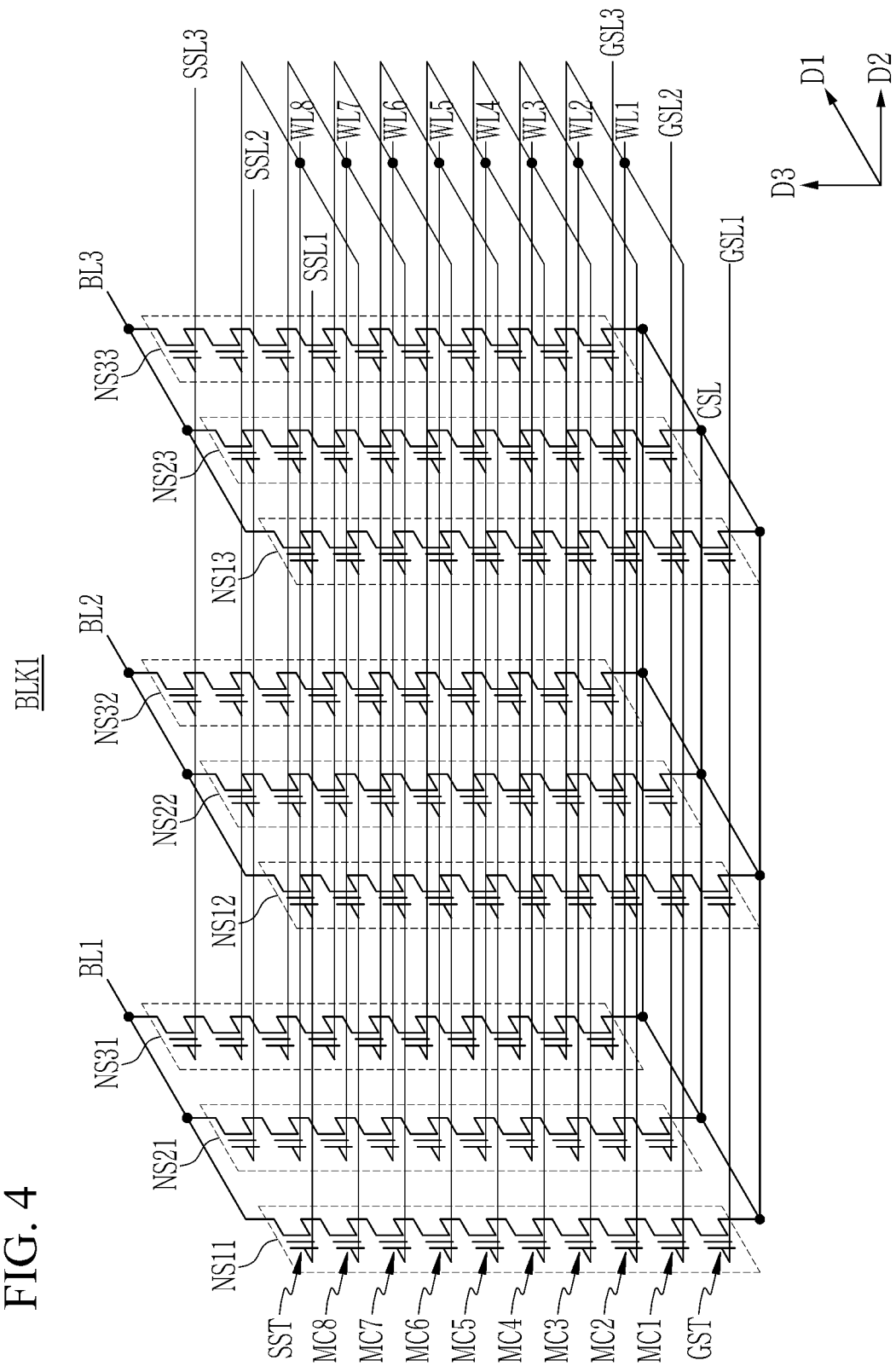
FIG. 4 is a circuit diagram to explain one memory block of a memory cell array.

FIG. 4 is a circuit diagram to explain one memory block of a memory cell array in FIG. 3. Each of the plurality of memory blocks BLK2 to BLKn included in the memory cell array 310 of FIG. 3 may have the same or similar structure as the memory block BLK1 shown in FIG. 4.

Referring to FIG. 4, the memory block BLK1 may include a plurality of memory NAND strings NS11 to NS33 connected between a plurality of bit lines BL1 to BL3 extending in a first direction D1 and a common source line CSL. The plurality of memory NAND strings NS11 to NS33 may be formed in a third direction D3 vertical to the first direction D1. Each of the plurality of memory NAND strings NS11 to NS33 may include a string select transistor SST, a plurality of memory cells MC1 to MC8, and a ground select transistor GST.

A gate of the string select transistor SST may be connected to corresponding string select lines SSL1 to SSL3. The plurality of memory cells MC1 to MC8 may each be connected to corresponding word lines WL1 to WL8. The word lines WL1 to WL8 may correspond to gate lines of the plurality of memory cells MC1 to MC8. A gate of the ground select transistor GST may be connected to corresponding ground select lines GSL1 to GSL3. The string select transistor SST may be connected to the corresponding bit lines BL1 to BL3, and the ground select transistor GST may be connected to the common source line CSL.

Among the memory cells MC1 to MC8 of each of the plurality of memory NAND strings NS11 to NS33, memory cells positioned at the same height may share the same word line WL. For example, the first memory cell MC1 of each of the plurality of memory NAND strings NS11 to NS33 may share the first word line WL1. The second memory cell MC2 of each of the plurality of memory NAND strings NS11 to NS33 may share the second word line WL2. Likewise, the third to the eighth memory cells MC3 to MC8 of each of the plurality of memory NAND strings NS11 to NS33 may share the third to the eighth word lines WL3 to WL8, respectively.

The memory cells sharing the same word line may form a physical page PAGE. For example, the physical page PAGE may include the memory cells disposed in a region where one word line (e.g., WL4) and a plurality of bit lines BL1 to BL3 intersect. The NAND flash memory device with the same structure as FIG. 4 may perform an erase operation by a block unit, and the program operation may be performed in a unit of the physical page PAGE corresponding to each word line WL1 to WL8.

The memory cells in the physical page PAGE corresponding to each word line WL1 to WL8 may have different speed characteristics depending on an oxide characteristic formed at the manufacturing stage. The speed of the memory cell may refer to a degree at which the threshold voltage distribution moves when a predetermined program voltage is applied to the memory cell. The memory device 110 may determine the speed characteristic of the memory cell connected to the word line. The memory device 110 may output the speed characteristic of the memory cell connected to the word line as a speed information SI. The memory device 110 may transmit an information about the speed characteristic of the memory cell to the memory controller 120. The state-shaping module 121 within the memory controller 120 may perform the state-shaping operation based on the speed characteristic of the memory cell connected to the word line received from the memory device 110.

Each memory cell may be a multi-level cell that stores two bits or more of a data. For example, if the memory cells included in the physical page are triple-level cells (TLCs) that store three bits of a data, each memory cell may be store a least significant bit (LSB) data, a central significant bit (CSB) data, and a most significant bit (MSB) data. In this case, the physical page may be logically divided and include a first logical memory page, a second logical memory page, and a third logical memory page. The first logical memory page may be a lowermost bit page, the second logical memory page may be a middle bit page, and the third logical memory page may be an uppermost bit page.

The memory block BLK1 shown in FIG. 4 is merely an example, and the number of the memory NAND string NS, the number of the cell transistors GST, MC, SST, and the like, and the numbers of the lines BL, WL, CSL, SSL, GSL, and the like connected to the cell transistors may be decreased or increased.

Figure 5A:
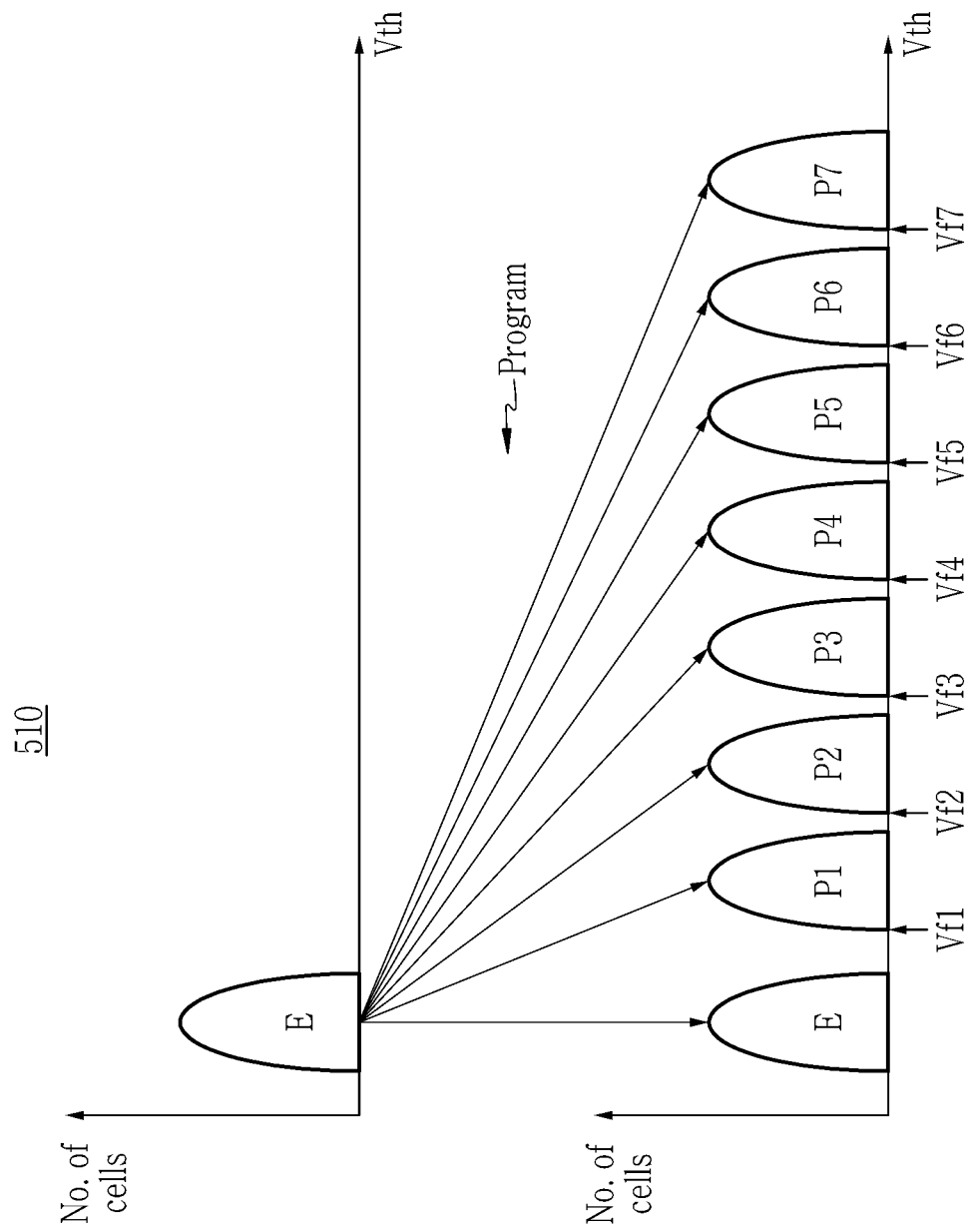
FIG. 5A is a view to explain a program operation of a memory device.
Figure 5B:
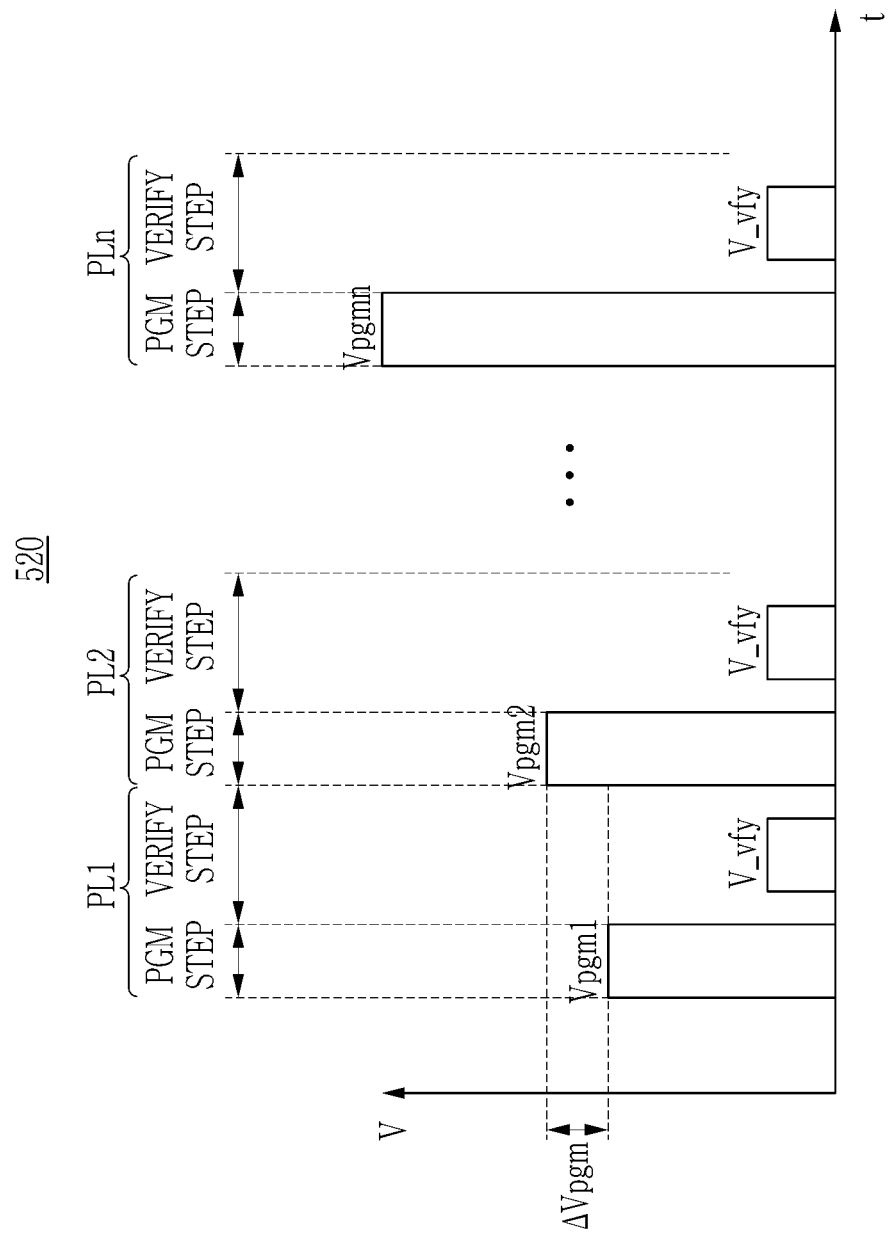
FIG. 5B is a view to explain a program operation of a memory device.

FIG. 5A and FIG. 5B are views to explain a program operation of a memory device. For better understanding and ease of description, each of the memory cells included in the memory device 110 is shown to be a triple level cell (TLC) that stores three bits of the data, but is not limited to this example.

FIG. 5A shows a threshold voltage distribution 510 in which the memory cells connected to a select word line of the memory device are programed from an erase state E to the erase state E, and a first program state P1 to a seventh program state P7.

When the memory device 110 performs the program operation, the program operation may be performed by a unit of the physical page PAGE. In other words, during the program operation, the address decoder (e.g., 330 in FIG. 3) may determine one of the plurality of word lines as the select word line. The voltage generator (e.g., 320 of FIG. 3) may apply the program voltage to the select word line, and the memory cells may be programed into the plurality of program states based on the data loaded to the page buffer (e.g., 340 of FIG. 3).

In FIG. 5A, a horizontal axis represents the threshold voltage Vth of the memory cell, and a vertical axis represents the number of the memory cells corresponding to the threshold voltage Vth. To program memory cells to have the first to the seventh program states P1 to P7, a sequentially increasing program voltage may be applied to the select word line. In other words, a plurality of pulses may be used to apply the program voltages of various sizes to the memory cells. The first to the seventh program states P1 to P7 may be verified using a first verification voltage Vf1 to a seventh verification voltage Vf7, respectively.

FIG. 5B shows the program voltage and the verification voltage (denoted by 520) supplied to the memory cell during the program operation. In FIG. 5B, a horizontal axis indicates a time (t) and a vertical axis indicates a voltage (V). Referring to FIG. 5B, after a program voltage Vpgm is applied to at least one select word line, a verification voltage V_vfy may be applied.

The program operation may include a plurality of program loops PL1 to PLn. The memory device may perform the plurality of program loops PL1 to PLn so that the selected memory cells may be programed to have one program state among a plurality of program states. Each of the plurality of program loops PL1 to PLn may include a program voltage application (a PGM step) of applying a corresponding program voltage and a verification (a Verify Step) of determining whether the memory cells are programed into a corresponding program state by applying a corresponding verification voltage.

For example, when the first program loop PL1 is performed, a first program voltage Vpgm1 is applied to the select word line, a verification voltage V_vfy may be applied to verify the program state of the plurality of memory cells. When the second program loop PL2 is performed, after a second program voltage Vpgm2 that is larger than the first program voltage Vpgm1 by Δ Vpgm is applied to the select word line, the verification voltage V_vfy may be applied to verify the program state of the plurality of memory cells. In this way, the memory device 110 may perform the program operation based on an incremental step pulse program (ISPP) method. The verification voltage V_vfy may include various values of the verification voltage depending on the program voltage Vpgm.

However, an ideal threshold voltage distribution of the erase state E and the program states P1, . . . , P7 of the memory cell may not be achieved because the threshold voltage distribution is changed due to various factors, and the changes in threshold voltage distribution may cause a negative impact on the data reliability of the memory device. The change of the threshold voltage distribution due to the degradation of the memory cell is described with reference to FIG. 6.

Figure 6:
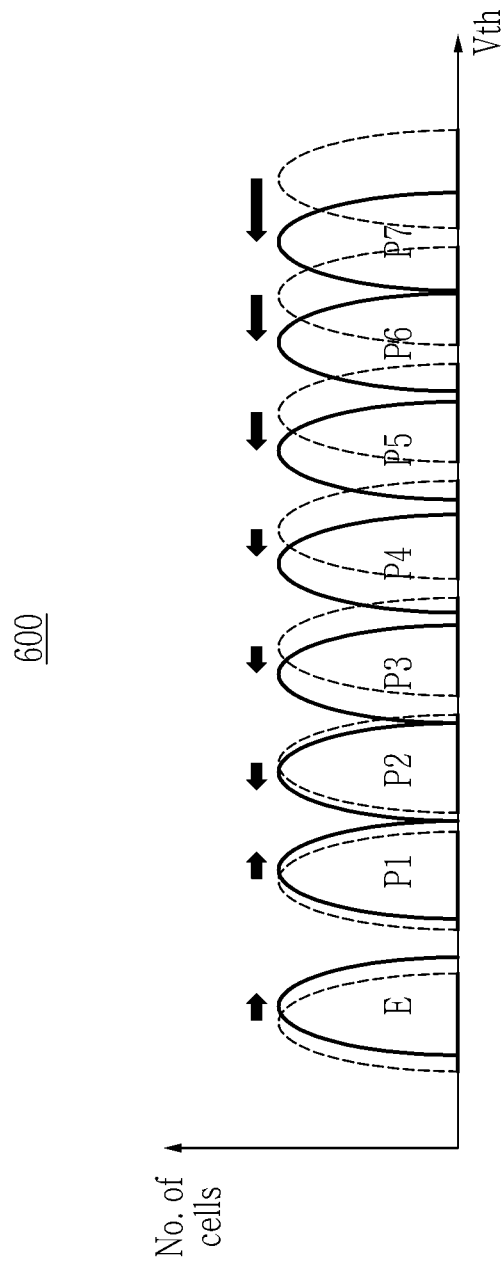
FIG. 6 is a view showing a threshold voltage distribution in a state where a memory cell is degraded.

FIG. 6 is a view showing a threshold voltage distribution 600 in a state that a memory cell is degraded.

The ideal threshold voltage distribution of the erase state E and the program states P1, . . . , P7 of the memory cell may be affected depending on various factors. For example, during when the memory cells are programmed or after the memory cells are programmed to have a threshold voltage distribution of FIG. 5A, the distribution of each threshold voltage may be distorted due to a charge leakage, a read disturbance, a temperature change, a repeated programming, and/or a memory cell degradation due to the erasing. In other words, depending on the degradation of the memory cell, the threshold voltage distribution of the memory cell with the erase state E and each program state P1 to P7 may shift. If the threshold voltage distribution of the erase state E and the program states P1, . . . , P7 of the memory cell formed by performing the program operation is changed due to various factors, the data may be read incorrectly during the read operation. That is, a read failure may occur.

Referring to FIG. 6, distribution indicated by a dotted line represents the ideal threshold voltage distribution of the erase state E and the program states P1, . . . , P7 of the memory cell, and distribution indicated by a solid line represents the threshold voltage distribution in a state where the memory cell is degraded. Additionally, the size of the arrow may indicate the movement amount of the threshold voltage distribution in the state where the memory cell is degraded. In other words, the higher the program state becomes, the greater the degradation of the memory cell may be due to the stress caused by the repetitive program operations. In an embodiment, the higher program state may refer to a program state of the memory cell that has the threshold voltage higher than a specific voltage (e.g., a virgin voltage) as a reference. In an embodiment, the higher program state may refer to an uppermost program state (e.g., the seventh program state P7).

Accordingly, the state-shaping module 121 may perform the state-shaping operation on the data corresponding to the program state in which the amount of the distribution movement of the threshold voltage is high due to the degradation, that is, the higher program state. The state-shaping module 121 may perform the state-shaping operation on the data corresponding to the higher program state, thereby reducing the number of times that the data corresponding to the higher program state is programmed to the memory device.

Meanwhile, memory cells with each program state for each word line WL may have different speed characteristics depending on the oxide characteristic formed at the manufacturing stage. Memory cells with a fast speed characteristic may have a relatively high threshold voltage when the same program voltage is applied. The memory cells with the fast speed characteristic may show a greater change in the threshold voltage than standard memory cells when the memory cells are in the degradation stage. In other words, the memory cell with the fast speed characteristic may cause an increase of an error bit. Therefore, the state-shaping module 121 may perform the state-shaping operation based on the speed characteristic of the memory cell. Specifically, the memory device 110 may determine the speed characteristic of the memory cell connected to the word line WL. The memory device 110 may output the speed characteristic of the memory cell connected to the word line WL as the speed information SI. The memory device 110 may transmit the speed information SI indicating the speed characteristic of the memory cell to the memory controller 120. The state-shaping module 121 may receive the speed information SI of the memory cell before performing the state-shaping operation. The state-shaping module 121 may consider the speed characteristic of the memory cell in performing the state-shaping operation.

In an embodiment, the state-shaping module 121 may perform the state-shaping operation on a cell with a fast speed characteristic among the memory cells corresponding to the program state that is a target of the state-shaping. In an embodiment, the memory cell with the fast speed characteristic among the memory cells corresponding to the program state that is the target of the state-shaping may be referred to as a target memory cell. The state-shaping operation of the state-shaping module 121 according to an embodiment may be performed on all or some of the target memory cell. In an embodiment, according to a result the state-shaping operation, a number of memory cells corresponding to the program state that is the target of the state-shaping may be reduced.

According to an embodiment, the state-shaping module 121 may perform the state-shaping operation for a memory cell having a large amount of a change in the threshold voltage among memory cells corresponding to a higher program state. In an embodiment, the state-shaping module 121 may perform the state-shaping operation for a memory cell having a high threshold voltage among the memory cells corresponding to a higher program state. In an embodiment, the state-shaping module 121 may perform the state-shaping operation for a memory cell with a higher program speed among the memory cells corresponding to a higher program state. The state-shaping operation according to an embodiment may avoid an increase of an error bit due to the degradation of the memory cells.

FIG. 7 to FIG. 13 is a view to explain a state-shaping method according to an embodiment.

Figure 7:
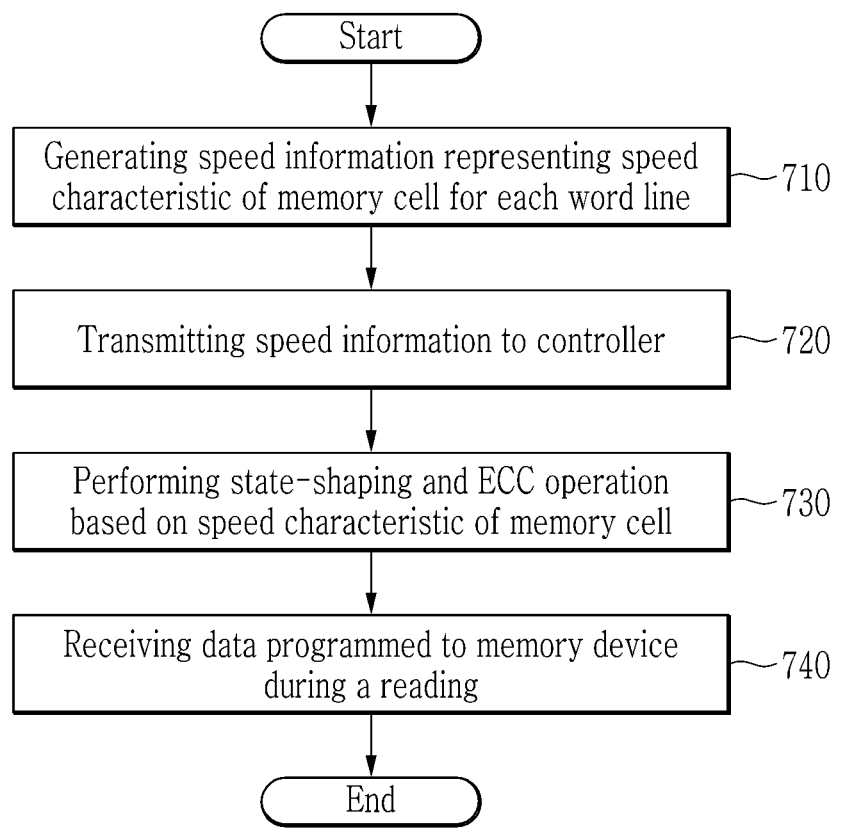
FIG. 7 is a flowchart of a state shaping operation according to an embodiment.

FIG. 7 is a flowchart of a state-shaping method according to an embodiment.

Referring to FIG. 7, a memory device 110 may output a speed information SI indicating a speed characteristic of a memory cell for each word line (S710). Alternatively, the memory device 110 may output the speed characteristic of the memory cell connected to a select word line as the speed information SI.

Step S710 is described in more detail with reference to FIG. 8 and FIG. 9.

Figure 8:
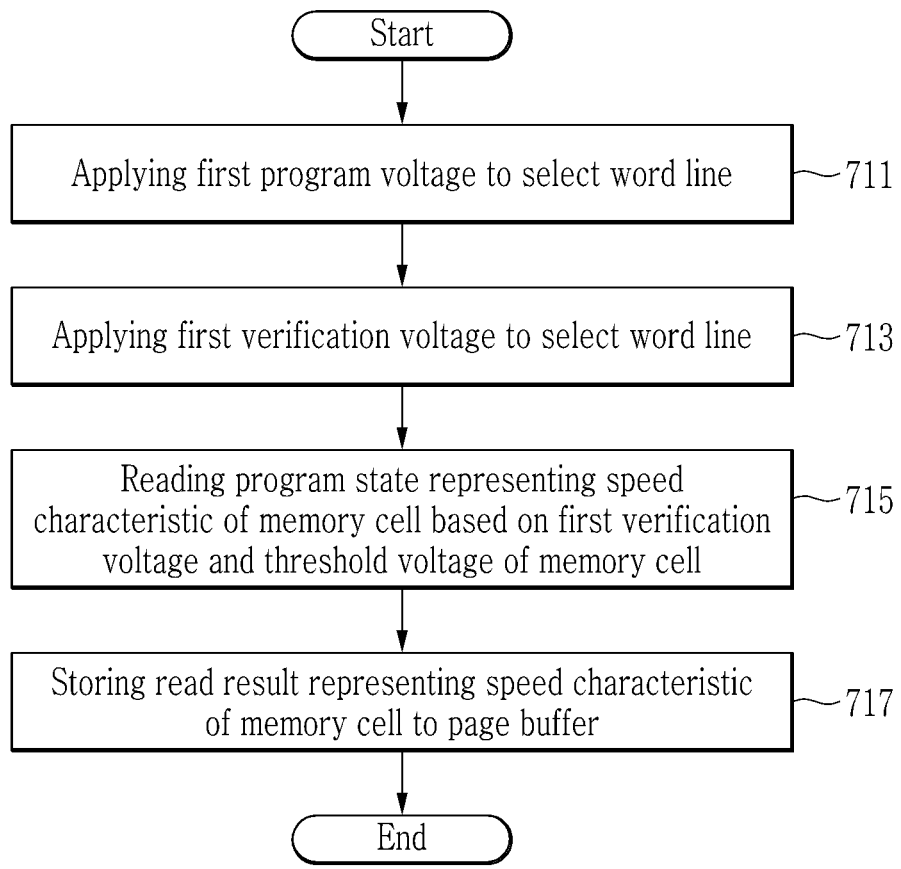
FIG. 8 is a view to explain a method for determining a speed characteristic of a memory cell according to an embodiment.
Figure 9:
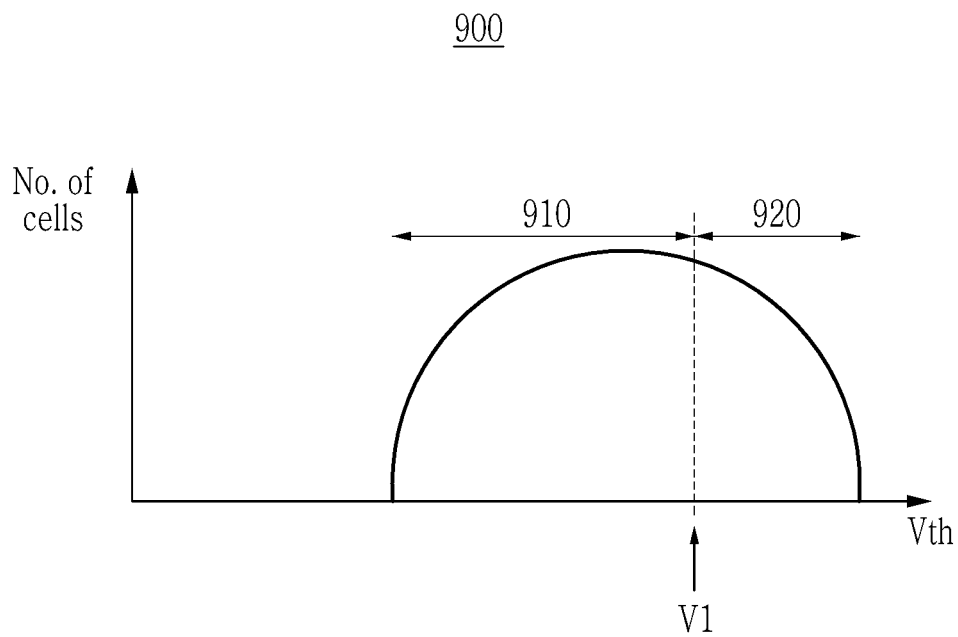
FIG. 9 is a view to explain a method for determining a speed characteristic of a memory cell according to an embodiment.

FIG. 8 and FIG. 9 are views to explain a method for determining a speed characteristic of a memory cell according to an embodiment.

In an embodiment, the speed characteristic of the memory cell may be determined based on the distribution of the threshold voltage of the memory cells that occurs when one program pulse voltage is applied to the select word line. In an embodiment, the speed characteristic of the memory cell may be determined by performing a first program loop PL1, that is, a one-shot loop, on the select word line.

Referring to FIG. 8, in order to determine the speed characteristic of the memory cell, the memory device 110 may apply a first program voltage Vpgm to the select word line (S711). FIG. 9 shows a threshold voltage distribution 900 of the memory cell connected to the select word line when the first program voltage Vpgm is applied to the select word line. If the first program voltage Vpgm is applied to the select word line WL, the memory cells connected to the select word line WL may form the distribution of the threshold voltage according to the characteristic of the memory cells.

In an embodiment, the memory device 110 may apply a first verification voltage V1 to the select word line to determine the characteristic of the memory cell (S713). The first verification voltage V1 may be a reference that is used to determine the speed characteristic of the memory cell. The first verification voltage V1 may be the same as or different from the first verification voltage Vf1 among the verification voltages V_vfy applied to the word line during the program operations.

In an embodiment, the memory device 110 may read a program state indicating the speed characteristic of the memory cell based on the verification voltage V1 applied to the select word line and the threshold voltage of the memory cell connected to the select word line (S715). Specifically, the memory device 110 may read the program state of the memory cells by using the verification voltage V1 applied to the select word line. For example, the program state of the memory cells of which the threshold voltage Vth is higher than the verification voltage V1 may be read as a first level, for example, a logic low, and the program state of the memory cells of which the threshold voltage Vth is lower than the verification voltage V1 may be read as a second level, for example, a logic high.

The read result of the memory cells connected to the select word line may indicate the speed characteristic of the memory cells. The memory cells with the fast speed characteristic may have a relatively high threshold voltage when the same program voltage is applied. Therefore, according to the read result of the memory cells based on the verification voltage V1, a memory cell 910 having a threshold voltage of a level lower than the verification voltage V1 may be a slow cell (that is, having a lower speed characteristic), and a memory cell 920 having a threshold voltage of a level higher than or equal to the verification voltage V1 may be a fast cell (that is, having a higher speed characteristic). The memory device 110 may output the read result indicating the speed characteristic of the memory cells as the speed information SI.

The memory device 110 may store the read result indicating the speed characteristic of the memory cell in the page buffer 340 (S717).

In an embodiment, the memory device may transmit an information about the speed characteristic for the memory cell to the memory controller as the speed information SI (S720). The memory device 110 may generate the speed information SI indicating the speed characteristic of the memory cell for each word line and transmit the speed information SI to the state-shaping module 121.

Referring back to FIG. 7, in an embodiment, during the program operation, the memory controller 120 may perform a state-shaping operation and an ECC operation on data DATA received from an outside based on the received speed characteristic of the memory cell (S730). For example, the memory controller 120 may perform the state-shaping operation on data DATA based on the speed characteristic of the memory cell and generate parity bits of an error correction code of the state-shaped data. The memory controller 120 may generate a transition data through the operation of the state-shaping module 121 and the ECC module 122.

Step S730 is described in more detail with reference to FIG. 10 to FIG. 12.

Figure 10:
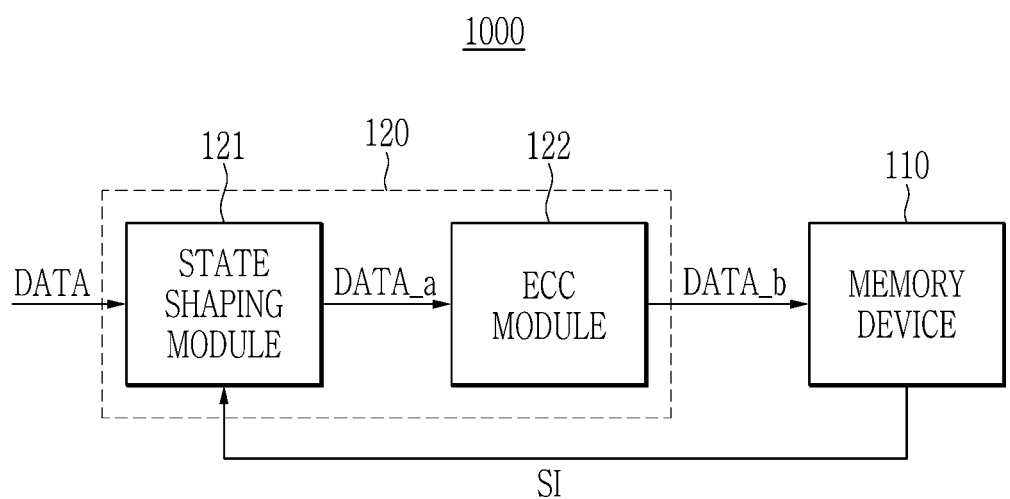
FIG. 10 is a block diagram to explain an operation of a memory controller according to an embodiment.

FIG. 10 is a block diagram 1000 to explain an operation of a memory controller according to an embodiment. In detail, FIG. 10 is the view to explain the program operation of the memory controller 120 according to an example embodiment of the disclosure. For better comprehension and ease of description, unnecessary constituent elements are omitted in explaining the operation of the memory controller 120.

Referring to FIG. 10, during the program operation, the memory controller 120 may receive data DATA from an outside, and the state-shaping module 121 may perform the state-shaping operation on the received data DATA. The memory device 110 may generate speed information SI indicating the speed characteristic of the memory cell connected to the select word line, and transmit the speed information SI to the state-shaping module 121. In an embodiment, the state-shaping module 121 may perform the state-shaping operation on the data DATA based on the speed information SI of the memory cell received from the memory device 110 and generate a state-shaped data DATA_a. In an embodiment, the state-shaping module 121 may perform the state-shaping operation on the data DATA corresponding to a higher program state based on the speed information SI of the memory cell received from the memory device 110, and generate the state-shaped data DATA_a. In an embodiment, the speed information SI of the memory cell may be stored in the buffer memory (e.g., 124 in FIG. 2) of the memory controller 110, and the state-shaping module 121 may use the speed information SI through the buffer memory 124 during the state-shaping operation.

An example embodiment of the state-shaping operation of the state-shaping module 121 is described later with reference to FIG. 11 and FIG. 12.

Next, the ECC module 122 may perform an ECC operation on the state-shaped data DATA_a and generate a transition data DATA_b. As an example, the transition data DATA_b may include the state-shaped data DATA_a and the error correction code. The memory controller 120 may generate the transition data DATA_b from the received data DATA based on the above-described operation and transmit the transition data DATA_b to the memory device 110. The memory device 110 may program the transition data DATA_b into the memory cell corresponding to the transition data DATA_b among the plurality of memory cells connected to the select word line. However, this is only an example embodiment and the disclosure is not limited thereto. For example, the state-shaping module 121 may transmit the state-shaped data DATA_a to the memory device 110 without the ECC operation being performed for the state-shaped data DATA_a, and the memory device 110 may program the state-shaped data DATA_a into the memory cell corresponding to the state-shaped data DATA_a among the plurality of memory cells connected to the select word line.

FIG. 11A, FIG. 11B, FIG. 12A, and FIG. 12B ae drawings to explain a target distribution 1110, 1120, 1210, 1220 that may be formed in a memory device as result of a state-shaping operation of a state-shaping module according to example embodiments. FIG. 11A, FIG. 11B, FIG. 12A, and FIG. 12B are provided for illustrative purposes only to help understand the disclosure, and example embodiments are not limited thereto.

Before performing the state-shaping operation, the state-shaping module 121 may determine the target program state on which the state-shaping operation is to be performed.

Figure 11A:
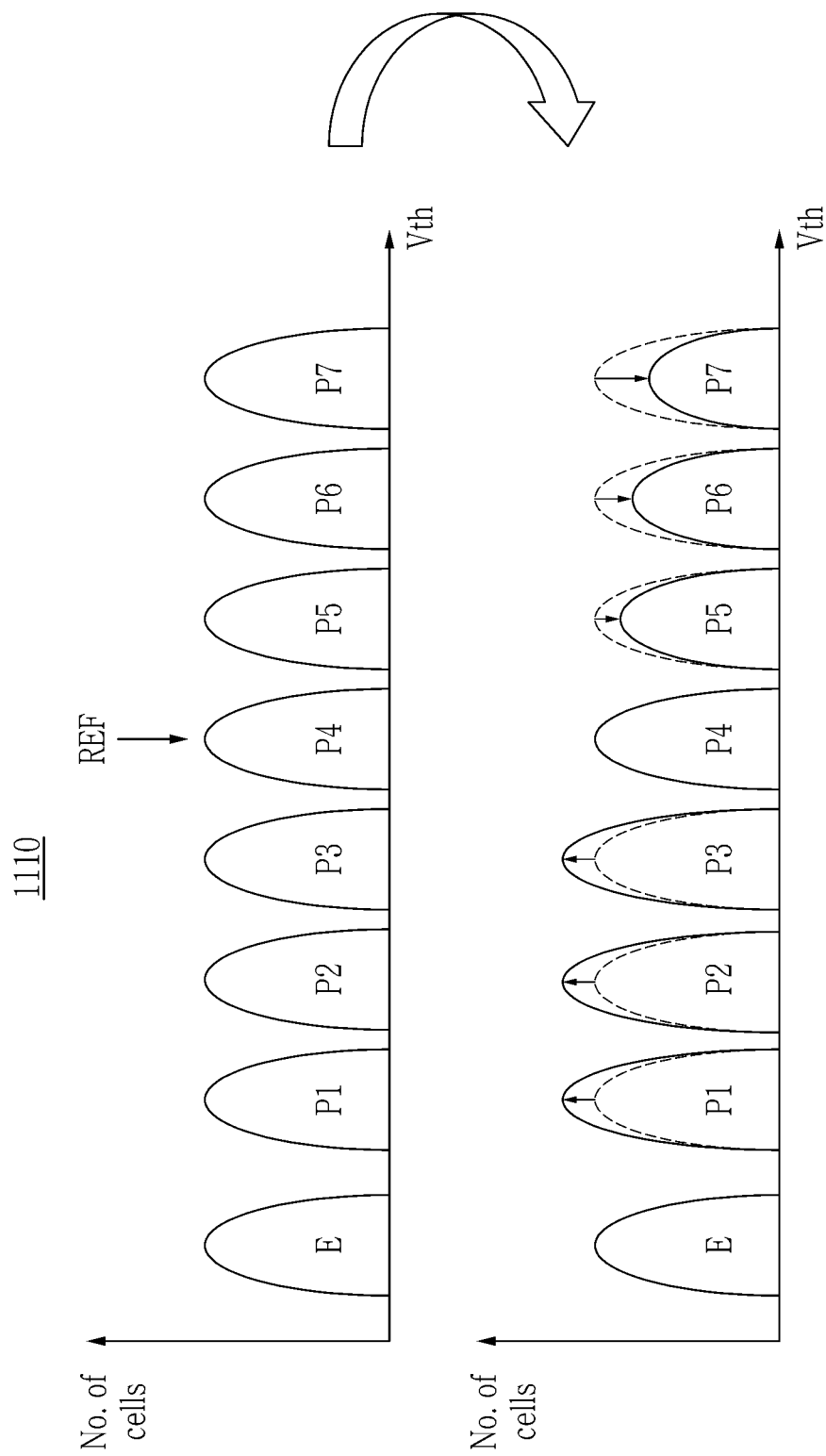
FIG. 11A is a view to explain a target distribution of a memory cell according to an embodiment.

In an embodiment, the state-shaping module 121 may determine a reference program state REF according to an external input or a predetermined reference. In an embodiment, the predetermined reference may refer to a specific voltage (e.g., a virgin voltage)), but is not limited thereto. In an embodiment, the state-shaping module 121 may determine the reference program state REF, determine a program state higher than the reference program state REF as the target program state, and perform the state-shaping operation for the data corresponding to the target program state. For example, as shown in FIG. 11A and FIG. 11B, the state-shaping module 112 may determine the fourth program state P4 as the reference program state REF according to an external input or a predetermined reference, and perform the state-shaping operations for the memory cell corresponding to the fifth to seventh program states P5 to P7 that has a higher level program state than the fourth program state P4.

In an embodiment, the state-shaping module 121 may determine a fast cell among the memory cells corresponding to the fifth to seventh program state (P5-P7) based on the speed information SI indicating the speed characteristic of the memory cell. The state-shaping module 121 may determine the fast cell as the target memory cell that is subject to the state-shaping operation, among the memory cells corresponding to the fifth to seventh program state (P5-P7) based on the speed information SI indicating the speed characteristic of the memory cell. The state-shaping module 121 may perform the state-shaping operation on the target memory cell.

In an embodiment, the state-shaping module 121 may perform the state-shaping operation on all of fast cells among the memory cells corresponding to the target program state.

In an embodiment, the state-shaping module 121 may perform the state-shaping operation on some of fast cells among the memory cells corresponding to the target program state.

In an embodiment, the state-shaping module 121 may limit a number of the memory cells subject to the state-shaping operation to a predetermined value or less. For example, when determining the fourth program state P4 as the reference program state REF, the number of the fast cells programmed to the fifth to seventh program states P5 to P7, which are a level higher than the fourth program state P4, may exceed the predetermined value. The state-shaping module 121 may determine a target memory cell that is the target of the state-shaping operation among the fast cells programmed in the fifth to seventh program states P5 to P7, and limit the number of the target memory cell to the predetermined value or less.

In an embodiment, when there are multiple program states higher than the reference program state REF and the state-shaping operation is performed on some of the fast cells among the memory cells corresponding to the multiple higher program states, the state-shaping module 121 may increase the number of the memory cells that are state-shaped as the program state becomes higher. Referring to FIG. 11A and FIG. 11B, when the state-shaping operation is performed on some of the fast cells among the memory cells corresponding to the fifth to seventh program states P5 to P7, the state-shaping module 121 may increase the number of the state-shaped memory cells as the program state becomes higher from the fifth program state P5 to the sixth program state P6, and to the seventh program state P7.

Figure 12A:
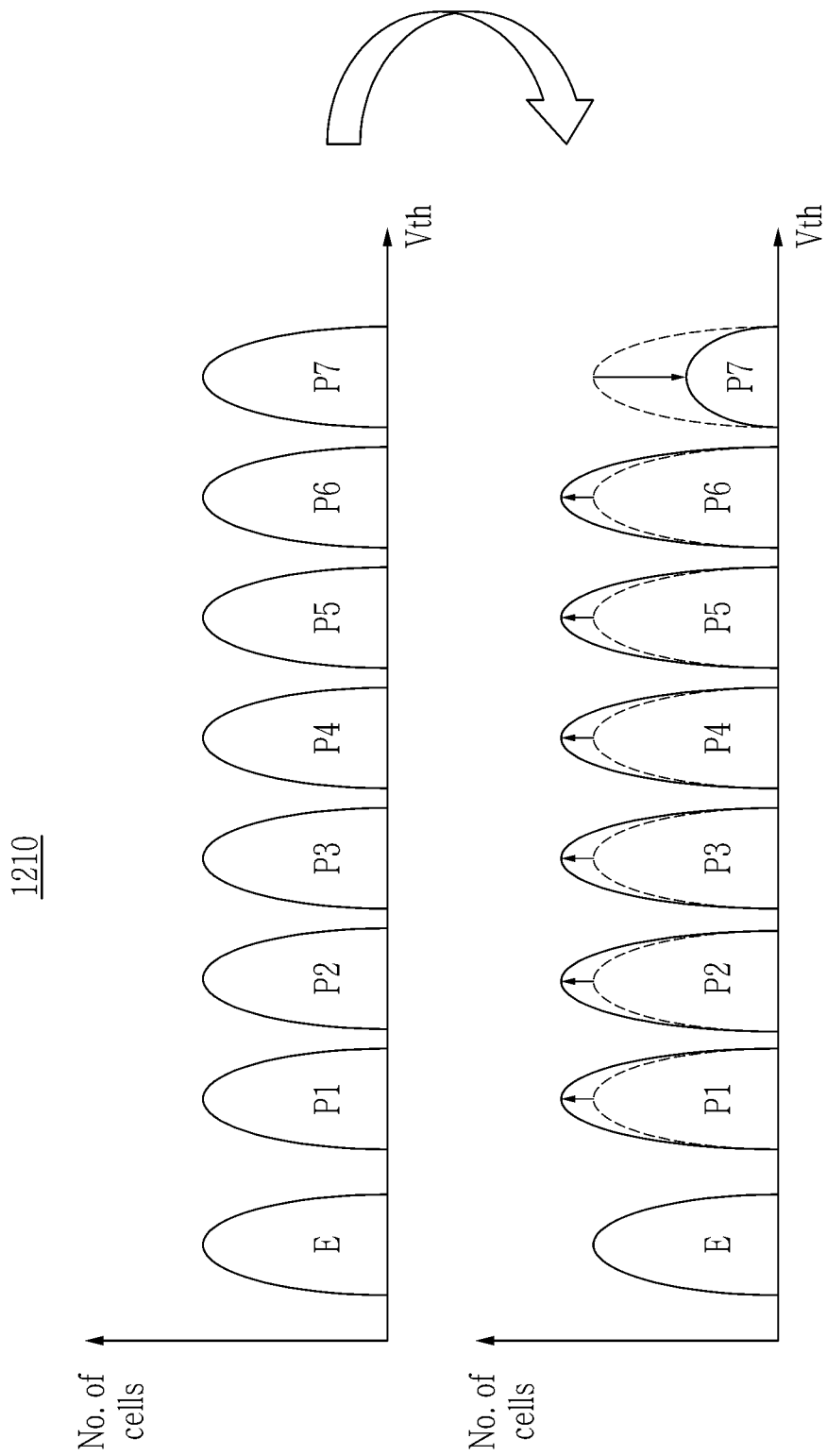
FIG. 12A is a view to explain a target distribution of a memory cell according to an embodiment.

In an embodiment, according to the state-shaping operation, the state-shaping module 121 may adjust to decrease the number of the fast cells among the memory cells corresponding to the fifth to seventh program states P5 to P7, and may also adjust to increase the number of the memory cells corresponding to each of the remaining program states P1-P3 as shown in FIGS. 11A and 11B. In an embodiment, the state-shaping module 121 may adjust to increase the number of the memory cells corresponding to the program states P1-P6 to be the same, as shown in FIG. 12A, or randomly adjust to increase the number of the memory cells corresponding to the program states P1-P5, as shown in FIG. 12B.

In an embodiment, the state-shaping module 121 may determine the seventh program state P7 of the highest program state as the target program state based on the characteristic of the memory cell, and perform the state-shaping operation on the data corresponding to the target program state.

In an embodiment, the state-shaping module 121 may determine the fast cell among the memory cells corresponding to the highest program state based on the speed information SI indicating the speed characteristic of the memory cell. The state-shaping module 112 may determine the fast cell as the target memory cell subject to the state-shaping operation, among the memory cells corresponding to the highest program state, based on the speed information SI indicating the speed characteristic of the memory cell. The state-shaping module 121 may perform the state-shaping operation on the target memory cell.

In an embodiment, the state-shaping module 121 may perform the state-shaping operation on all of fast cells among the memory cells corresponding to the highest program state.

In an embodiment, the state-shaping module 121 may perform the state-shaping operation on some of fast cells among the memory cells corresponding to the highest program state.

In an embodiment, the state-shaping module 121 may limit the number of the memory cells subject to the state-shaping operation to a predetermined value or less. For example, when performing the state-shaping operation on the target memory cell among the memory cells corresponding to the program states subjected to the state-shaping operation, the number of the target memory cells may be limited to the predetermined value or less.

The state-shaping module 121 may adjust to decrease the number of the fast cells among the memory cells corresponding to the seventh program state P7, and may also adjust the number of the memory cells corresponding to each of the remaining program states P1 to P6 to increase and be the same (FIG. 12A) or to be random (FIG. 12B).

Depending on an embodiment, the state-shaping module 121 may limit the number of the target memory cells to the predetermined value or less, and thus, the operation speed of the storage device may be improved by limiting the number of the target memory cells to the predetermined value or less.

In an embodiment, during the read operation, the memory controller 120 may receive the transition data DATA_b programmed to the memory device 110 from the memory device 110 (S740).

Step S740 is described in more detail with reference to FIG. 13.

Figure 13:
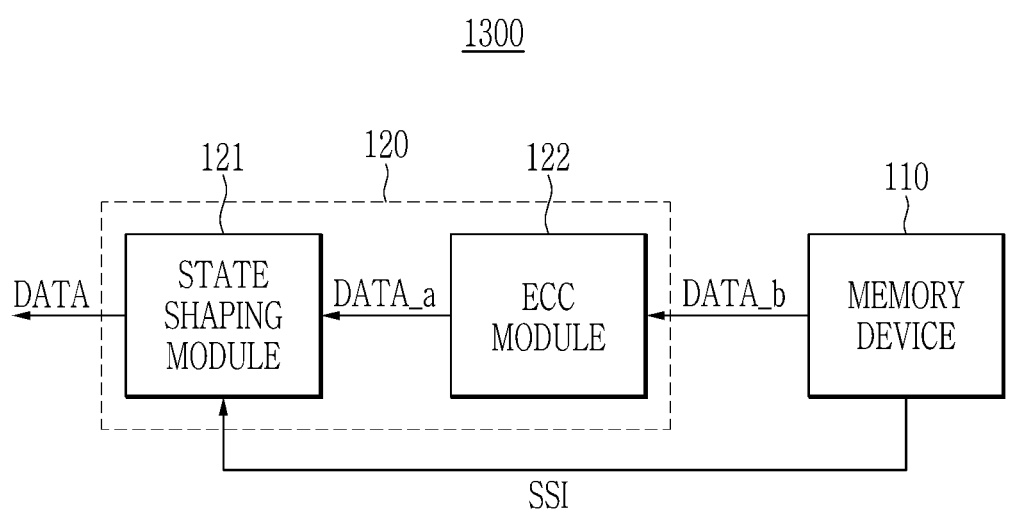
FIG. 13 is a block diagram to explain an operation of a memory controller according to an embodiment.

FIG. 13 is also a block diagram 1300 for explaining an operation of a memory controller according to an embodiment. Specifically, FIG. 13 is a drawing to explain a read operation of the memory controller 120 according to an example embodiment of the disclosure. For better comprehension and ease of description, unnecessary constituent elements are omitted in explaining the operation of the memory controller 120.

During the read operation, the page buffer 340 in the memory device 110 may detect the current or voltage of the selected bit line, detect the transition data DATA_b stored in the memory cell array 310, and provide the information to the memory controller 120. The ECC module 122 may generate the state-shaped data DATA_a from the transition data DATA_b received from the memory device 110. The state-shaping module 121 may inversely transform the state-shaped data DATA_a to create the data DATA and transmit the data DATA to the outside. However, this is only an example embodiment and the disclosure is not limited thereto. For example, the state-shaping module 121 may directly receive the state-shaped data DATA_a programmed to the memory device 110 without going through the ECC module 122. In this case, the state-shaping module 121 may inversely transform the state-shaped data DATA_a to generate the data DATA, and transmit the data DATA to the outside.

According to an embodiment, the state-shaping module 121 may perform the state-shaping operation on the fast cell among the memory cells corresponding to the higher program state based on the speed information SI indicating the speed characteristic of the memory cell. The state-shaping operation according to an embodiment may improve the data reliability of the memory device and reduce an increase of an error bit.

Figure 14:
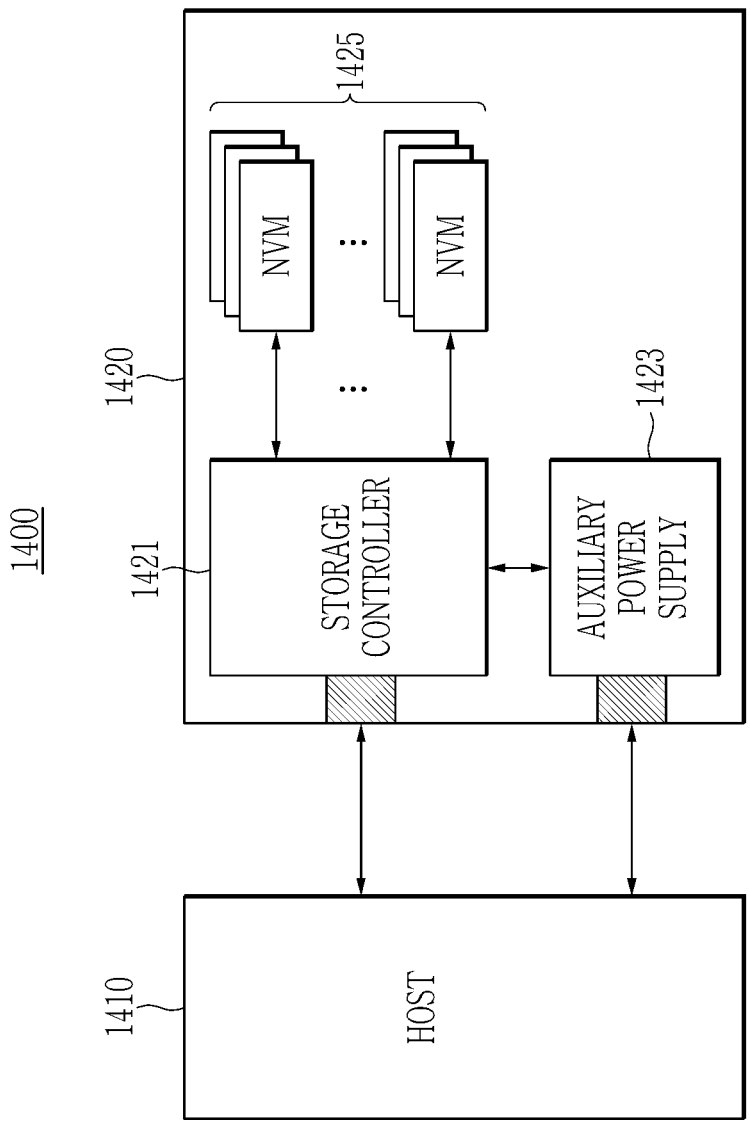
FIG. 14 is a schematic block diagram of a computing system according to an embodiment.

FIG. 14 is a schematic block diagram of a computing system according to an embodiment.

Referring to FIG. 14, a computing system 1400 may be implemented as, for example but not limited to, a personal computer (PC), a data server, a laptop computer, or a portable device. The portable device may be implemented as, for example but not limited to, a mobile phone, a smart phone, a tablet PC, a wearable device, a personal digital assistant (PDA), an enterprise digital assistant (EDA), a digital still camera, a digital video camera, a portable multimedia player (PMP), a PND (Personal Navigation Device or Portable Navigation Device), a portable game console, or an e-book. Additionally, the computing system 1400 may be implemented as a system-on-a-chip (SoC).

The computing system 1400 may include a host 1410 and a storage device 1420. The host 1410 may request a data processing operation, for example, a data read operation, a data write (or program) operation, and a data erase operation, etc. to the storage device 1420. For example, the host 1410 may be a CPU, a GPU, a microprocessor, or an AP.

The storage device 1420 transmits and receives signals with the host 1410 through a signal connector and receives a power input through a power connector. The storage device 1410 may include a storage controller 1421, an auxiliary power supply 1423 and a plurality of non-volatile memory devices 1425.

The plurality of non-volatile memory devices 1425 according to example embodiments of the disclosure may determine the speed characteristic of the memory cell. The storage controller 1421 according to example embodiments of the disclosure may receive the speed information regarding the speed characteristic of the memory cell from the non-volatile memory devices 1425. The storage controller 1421 according to example embodiments of the disclosure may perform the state-shaping operation on the data based on the speed information received from the plurality of non-volatile memory devices 1425.

While this disclosure has been described in connection with what is presently considered to be example embodiments, it is to be understood that the disclosure is not limited to the example embodiments. On the contrary, it is intended to cover various modifications and equivalent arrangements included within the spirit and scope of the appended claims and their equivalents.

What is claimed is:

1. A storage device comprising:
a memory device configured to select a first word line among a plurality of word lines; apply a first program voltage and a first verification voltage to the first word line; and output, based on a program state of each of a plurality of memory cells connected to the first word line that is read based on the first verification voltage, a speed information representing a speed characteristic of each of the plurality of memory cells; and
a memory controller configured to determine, among the plurality of memory cells, at least one memory cell to be programmed into a predetermined program state among a plurality of program states; determine, among the at least one memory cell, at least one target memory cell having a first speed characteristic based on the speed information; and perform a state-shaping operation to convert a data corresponding to the predetermined program state for the at least one target memory cell into a value corresponding to a program state that is different from the predetermined program state,
wherein the memory controller is configured to, based on a number of memory cells to be programmed into the predetermined program state and having the first speed characteristic exceeding a predetermined number, determine, among the number of memory cells, the at least one target memory cell of the predetermined number or less.

2. The storage device of claim 1, wherein the memory controller is configured to perform the state-shaping operation to convert the data corresponding to the predetermined program state into a value corresponding to a lower program state than the predetermined program state.

3. The storage device of claim 2, wherein the predetermined program state is a higher program state than a reference program state, and the lower program state is a program state lower than the reference program state, the reference program state being determined according to an external input or a predetermined reference.

4. The storage device of claim 1, wherein the predetermined program state includes a plurality of predetermined program states, and a number of a target memory cell in a higher program state among the plurality of predetermined program states is greater than a number of a target memory cell in a lower program state among the plurality of predetermined program states.

5. The storage device of claim 1, wherein the predetermined program state is a highest program state among the plurality of program states.

6. The storage device of claim 2, wherein the plurality of program states includes a plurality of lower program states than the predetermined program state, and
wherein a number of memory cells having the first speed characteristic and programmed into each of the plurality of lower program states increases equally according to the state-shaping operation.

7. The storage device of claim 2, wherein the plurality of program states includes a plurality of lower program states than the predetermined program state, and
wherein a number of memory cells having the first speed characteristic and programmed into each of the plurality of lower program states increases randomly according to the state-shaping operation.

8. The storage device of claim 1, wherein based on the first program voltage being applied to the first word line, the at least one target memory cell has a threshold voltage equal to or higher than the first verification voltage.

9. The storage device of claim 1, wherein the memory controller is configured to not perform the state-shaping operation for a memory cell, among the plurality of memory cells, of which a speed characteristic is different from the first speed characteristic.

10. An operation method of a storage device comprising:
selecting a first word line among a plurality of word lines;
generating a speed information representing a speed characteristic of each of a plurality of memory cells connected to the first word line;
determining at least one memory cell among the plurality of memory cells that is programmed into a predetermined program state among a plurality of program states;
determining a first memory cell having a first speed characteristic among the at least one memory cell, based on the speed information; and
performing a state-shaping operation to convert a data corresponding to the predetermined program state for the first memory cell into a value corresponding to a program state different from the predetermined program state,
wherein the determining the first memory cell comprises, based on a number of memory cells to be programmed into the predetermined program state and having the first speed characteristic exceeding a predetermined number, determining, among the number of memory cells, the first memory cell of the predetermined number or less.

11. The operation method of the storage device of claim 10, wherein the generating the speed information includes:
applying a first program voltage and a first verification voltage to the first word line; and
reading a program state of each of the plurality of memory cells based on the first verification voltage, and generating the speed information based on the read program state.

12. The operation method of the storage device of claim 10, wherein the first memory cell has a higher threshold voltage among the at least one memory cell.

13. The operation method of the storage device of claim 10, wherein the performing the state-shaping operation includes:
generating a state-shaped data having a value corresponding to a lower program state than the predetermined program state.

14. The operation method of the storage device of claim 13, wherein the predetermined program state is a higher program state than a reference program state, and the lower program state is a program state lower than the reference program state, the reference program state being determined according to an external input or a predetermined reference.

15. The operation method of the storage device of claim 13, wherein the predetermined program state is a highest program state among the plurality of program states.

16. The operation method of the storage device of claim 13, further comprising:
inversely transforming the state-shaped data; and
transmitting data generated through the inversely transforming the state-shaped data to an outside of a memory controller of the storage device.

17. A computing system comprising:
a host device configured to output a command requesting a program operation of a memory device; and
a memory controller configured to receive, from the memory device, a speed information indicating whether a plurality of memory cells connected to a select word line are fast cells or slow cells; determine a target memory cell, among the fast cells, that is to be programmed into a predetermined program state among a plurality of program states; and perform, based on the command, a state-shaping operation on a data corresponding to the predetermined program state for the target memory cell,
wherein the memory controller is configured to, based on a number of fast cells to be programmed into the predetermined program state exceeding a predetermined number, determine, among the number of fast cells, the target memory cell of the predetermined number or less.

18. The computing system of claim 17, wherein the speed information is received from the memory device based on a first program loop on the select word line, the speed information being based on a program state of each of the plurality of memory cells that is read based on the first program loop.

19. The computing system of claim 17, wherein the predetermined program state is a higher program state than a reference program state that is determined according to an external input or a predetermined reference, or the predetermined program state is a highest program state among the plurality of program states.

* * * * *